Dec. 12, 1950  L. N. McGRATH ET AL  2,533,490
FUEL GAUGE FOR TRACTORS
Filed April 15, 1948
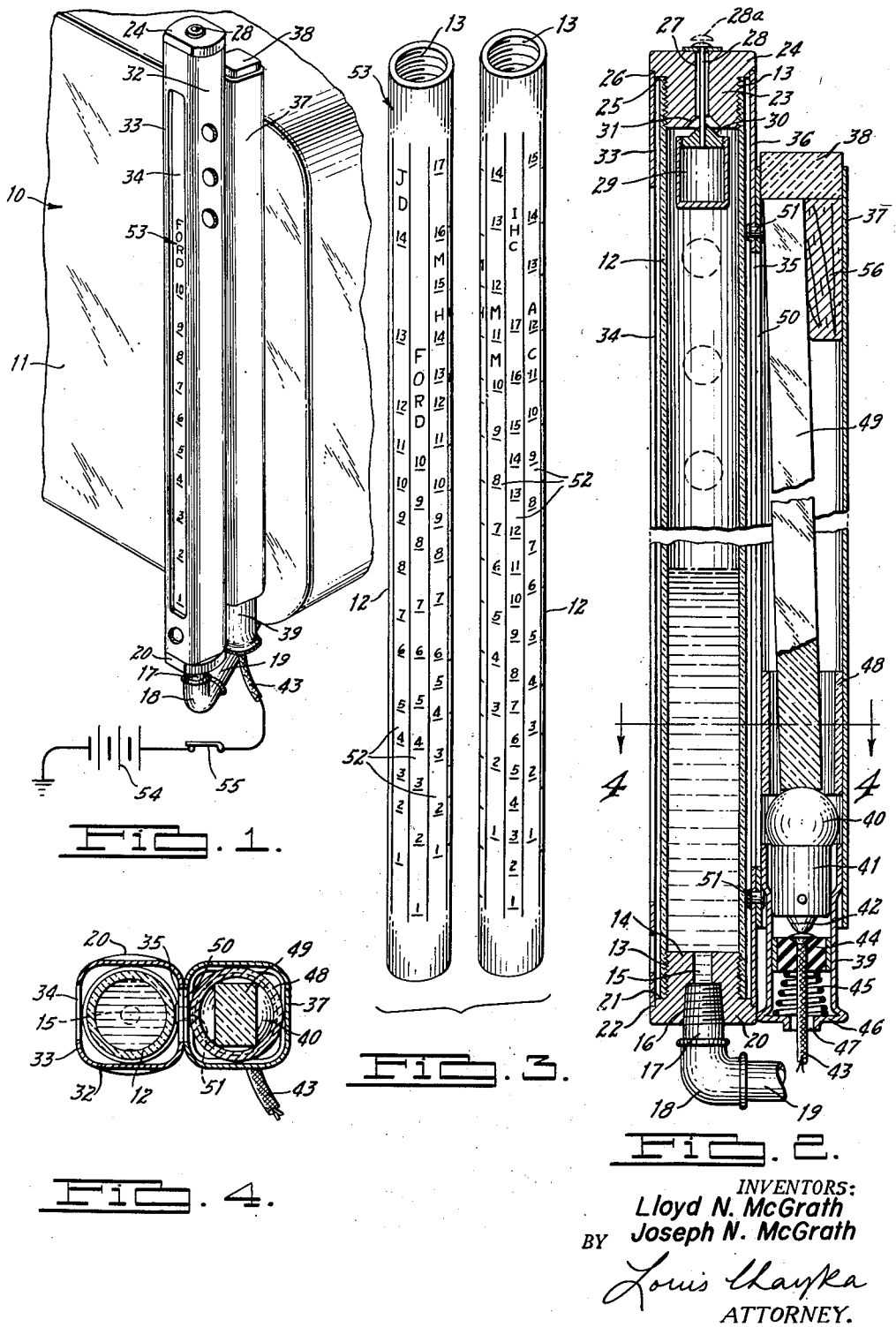
INVENTORS:
Lloyd N. McGrath
Joseph N. McGrath
BY Louis Chayka
ATTORNEY.

Patented Dec. 12, 1950

2,533,490

UNITED STATES PATENT OFFICE 2,533,490

FUEL GAUGE FOR TRACTORS

Lloyd N. McGrath and Joseph N. McGrath, Detroit, Mich.

Application April 15, 1948, Serial No. 21,178

2 Claims. (Cl. 73—325)

Our improvement pertains to gauges for liquids of the type in which a transparent, upright tube, connected to the lower portion of a vessel containing liquid, will disclose the level thereof in said vessel. As improved by us, said gauge includes a plurality of novel and desirable features. One of these features consists in employment of a translucent, light-conducting bar made of "Lucite" or such similar plastic and placed back of the transparent tube for illumination of the tube from the back, the light being supplied by a suitable electric bulb placed within the lower portion of the gauge.

Another improvement pertains to a feature by means of which our gauge may be usefully employed on a plurality of tanks irrespective of their vertical dimension. It is known that tanks on different makes of tractors do not come in the same sizes and that, therefore, ordinarily, gauges of different vertical dimensions would have to be employed for specific tanks. Obviating this necessity, our gauge includes a transparent tube having a plurality of calibrations disposed longitudinally on the surface thereof, the tube being adapted to be rotated axially to supply a series of calibrations suitable for a particular tank, whereupon the tube may be locked in place against rotation.

Other features and advantages of our improvement will be shown in the course of the specifications of our gauge which shall be now described with reference to the accompanying drawings.

Figure 1 in said drawings shows a perspective view of our gauge as connected to a tank which is shown only in fragment;

Figure 2 is an enlarged, longitudinal, sectional view of our gauge;

Figure 3 is a perspective view of a transparent tube employed in our gauge, but displayed from two opposite sides in order to disclose the variety of calibrations thereon;

Figure 4 is a transverse, sectional view of our gauge taken on line 4—4 of Figure 2;

Similar numerals refer to similar parts throughout the several views.

In Figure 1, we are showing our gauge, generally indicated by numeral 10, with respect to a tank which is marked 11. The location of the gauge with respect to the tank is important only to this extent, that the bottom calibration on the gauge ought to be more or less at the bottom level of the tank, otherwise the gauge may be affixed to any suitable position on the tank or, even, away therefrom.

The principal element of the gauge is a tube 12, ordinarily made of glass, and threaded at both ends, as indicated by numeral 13. A plug 14 is threaded into the bottom of the gauge, the plug having an axial passage 15 expanded at 16 and threaded therein for reception of a nipple 17. The latter, connected by an elbow 18 to a tube 19, leads to what is known as the sediment bulb affixed to the bottom of the tank. The connection, being well known, needs no illustration and is not shown in the drawings. It is obvious that said connection is only suggestive and that pipe 19 may be connected in any other desirable manner to the bottom end of the tank.

The lower part of the plug 14 is expanded, as shown at 20, and includes two steps 21 and 22, forming annular shoulders. The upper one, namely 21, serves as a supporting base for said tube 12. At the top, the tube is closed by another plug 23 having an expanded head 24 which, like the lower plug, is provided with two annular shoulders, 25 and 26, said shoulder 25 being in abutment with the upper rim of said tube 12. The plug contains an axial vent 27. A pin 28, axially disposed within vent 27, extends downwardly and is connected within tube 12 to a floating valve 29, the valve having a conical top 30 fitting into a correspondingly formed recess 31 in the bottom of plug 23. It will be understood that the floating valve will be operated by the liquid in the tube and that the vent 27 will be closed when the liquid will rise sufficiently high within the tube to force said floating valve against the lower end of said vent 27, where it opens into said recess 31. Normally, enough space remains between the inner surface of vent 27 and pin 28 to permit escape of air from the tube on rise of liquid therein.

The tube is enclosed by a sheet-metal casing 32, held in place at opposite ends by shoulders 22 and 26 of the respective plugs. The casing, being substantially rectangular, contains a long, narrow window 34 in its front wall 33 and another window 35 in the rear wall, said window being aligned longitudinally, although window 35 is somewhat shorter. Affixed to the rear wall of casing 32 is an oblong, substantially rectangular casing 37 plugged at the top by closure 38 and having in its lower end a shell 39 which is frictionally held in place within said casing 37. The shell is diametrically large enough to enclose an electric bulb 40, one terminal, 41, of which is in contact with said shell 39, while the other terminal, 42, is in contact with a knob-shaped end of cable 43 leading to an electric battery 54, said shell 39 forming the ground end of the electric circuit for lighting said bulb.

The cable, as will be noted, passes through a rubber insulating plug 44. A coiled spring 45, disposed under the plug, keeps the said member 43 in contact with the respective element of the bulb, the spring at the opposite end bearing against bottom 46 of said shell 39, said bottom being provided with an aperture 47 for passage of said cable 43.

Retained within the casing 37 by means of a translucent sleeve 48, axially disposed above said bulb 40, and by means of a wedge-like member 48, below closure 38, is a bar 49 of "Lucite" or other similar plastic. The bar extends along the window 50 in said casing 37, the window being in register with said window 35 in casing 32 which encloses tube 12, the two casings, 32 and 37, being held together by means of bolts 51. Now I shall refer to the transparent tube 12 which is located in said casing 32.

This, as will be noted, is provided, on its outer surface, with a plurality of different sets of calibrations, presented in vertical columns as shown by numeral 52 in Figure 3, each set being suitable for one particular make of tractor tanks. The sets of calibrations are identified by specific initials or names to identify the respective makes of tractors.

The operation of the gauge is quite obvious. As already indicated, it may be affixed by suitable means, such as a clamp, to a wall of the tank in such a manner that the calibrations on tube 12 will be easily visible through said window 34. The preferred installation is such that the casing which includes the "Lucite" bar abuts the tank, while the casing containing the calibrated tube is turned outwardly with respect to the tank.

Since, as already indicated, the gauge is connected to the tank by means of pipe 9, liquid in tube 12 will rise to the level of the fluid in the tank, forcing out the air thereabove through vent 27. To prevent spilling of fuel through the vent in cases when, owing to the uneven ground, the fluid in the gauge may be agitated and thrown upwardly, we have provided a floating valve, already described. Should the fluid rise high enough, the floating valve will be raised into the conical recess 31, plugging said vent 27.

The adjustment of the tube with respect to the desired calibration may be effected quite easily by loosening plug 23 on top of tube 12 and turning the tube around its axis to the desired set of calibrations is clearly visible through said window 34. When the electric bulb 49 is lighted by means of electric current from battery 54, the light carried by said plastic bar 45 will illuminate the whole length of tube 12 and the whole column of liquid therein so that the numerals of said calibrations will be clearly visible and will stand out against an illuminated background.

It will be understood that some changes may be made in the construction of our gauge without materially departing from the inventive principles disclosed herein.

What we, therefore, wish to claim is as follows:

1. A fuel gauge for tractor tanks, the gauge including a transparent, vertical tube provided with a plurality of vertical columns of calibrations on its outer surface, a plug threaded into the tube at its lower end, the plug having an axial aperture therein and being connected to a nipple leading, by means of a pipe, to the lower portion of a tank, a plug threaded into the upper end of the tube and provided with an air vent therein, an oblong casing enclosing the tube, the casing including a front wall and a rear wall, an oblong window in the front wall to frame one column of said calibrations, a window in the rear wall opposite said window in the front wall, a vertical, light-conveying plastic bar placed opposite the window in the rear wall of the casing and extending back of the tube substantially parallel thereto, an electric-light bulb disposed under the bar to illuminate the whole length thereof, the light transmitted by the bar being adapted to light up the whole length of the tube and a casing enclosing said plastic bar and said light bulb, the above-said tube being adapted to be rotated around its axis to display through the window in said front wall a chosen column of calibrations.

2. A fuel gauge for tractor tanks, the gauge including a transparent vertical tube inwardly threaded at each end and provided on its outer surface with a plurality of vertical columns of calibrations, a plug threaded into each end of the tube, the upper plug having a vent therein, the lower plug having pipe means for connection to the tank, the plugs having annular shoulders for support therebetween of a casing for the tube, the casing including a narrow vertical front window and a vertical rear window, the tube being adapted to be turned axially on loosening of the upper plug to display a selected column of calibrations through said front window, and means to illuminate the tube through the rear window.

LLOYD N. McGRATH.
JOSEPH N. McGRATH.

REFERENCES CITED

The following references are of record in the file of this patent:

UNITED STATES PATENTS

| Number | Name | Date |
|---|---|---|
| 1,570,179 | Prouty et al. | Jan. 19, 1926 |
| 1,979,982 | McMullen | Nov. 6, 1934 |
| 2,289,374 | Martin | July 14, 1942 |
| 2,368,123 | Edelmann | Jan. 30, 1945 |